United States Patent [19]
Jurkiewicz et al.

[11] Patent Number: 5,038,135
[45] Date of Patent: Aug. 6, 1991

[54] SENSOR COMMUNICATIONS NETWORK, DOOR LATCH MECHANISM THEREFOR

[75] Inventors: James S. Jurkiewicz, Mt. Clemens; Johnnie W. Johnson, Plymouth, both of Mich.

[73] Assignee: Chrysler Corporation, Highland Park, Mich.

[21] Appl. No.: 522,774

[22] Filed: May 14, 1990

[51] Int. Cl.$^5$ .............................................. B60Q 9/00
[52] U.S. Cl. ..................................... 340/457; 340/459
[58] Field of Search .................. 340/457, 459, 438; 370/24

[56] References Cited

U.S. PATENT DOCUMENTS

| | | | |
|---|---|---|---|
| 3,818,432 | 6/1974 | Keating | 340/457 |
| 4,677,308 | 6/1987 | Wroblewski et al. | 340/459 |
| 4,965,550 | 10/1990 | Wroblewski | 340/459 X |
| 4,983,947 | 1/1991 | Mullen et al. | 340/426 |

Primary Examiner—Joseph A. Orsino
Assistant Examiner—Brian R. Tumm
Attorney, Agent, or Firm—Wendell K. Fredericks

[57] ABSTRACT

A sensor communications network connects over a single-wire bus to smart sensors arranged in the latch mechanism of doors of a vehicle for lighting a courtesy light when the doors are open and for turning on an ajar indicator when the doors are ajar and/or open during the presence of the ignition voltage.

5 Claims, 4 Drawing Sheets

5,038,135

SENSOR COMMUNICATIONS NETWORK, DOOR LATCH MECHANISM THEREFOR

FIELD OF THE INVENTION

This invention relates to door latch mechanisms employing sensors to detect latching operations of the door latch and, in particular, in a preferred embodiment to door latch mechanisms that contain smart sensors which send command signals to a sensor communications network over a single wire to indicate when a vehicular door is open, ajar or closed.

DESCRIPTION OF THE BACKGROUND

Conventional vehicular car doors employ individual OFF and ON pushbutton type switches mounted in door sills of vehicles to detect when the door is open, ajar or closed. Separate wires route from each switch to a central control unit which will receive the signal and then issue command signals to circuits that will illuminate the courtesy light of the vehicle if the door is open and will cause a door ajar indicator to respond if the door is in an ajar condition.

Such a system requires several wires to be routed through door post and pillar post of the vehicle.

Knowing that sensor communication technology is available, as evidenced in U.S. Pat. No. 4,736,367 entitled "Smart Control And Sensor Devices Single Wire Bus Multiplex System" which issued Apr. 5, 1988, the present inventors sort ways and means to apply such technology to vehicle door latches. That search resulted in the improved door latch system of the present invention.

SUMMARY OF THE INVENTION

Smart sensors mounted in a door latch mechanism for detecting when the door latch is in an open or a door-ajar condition provide electrical signals to a sensor communication network over a single wire bus. The sensor network generates commands from the electrical signals for commanding door-ajar and door-open indicators and light driver circuits to turn on the respective indicator and lights. When the door is ajar, only the ajar indicator illuminates. When the door is open, both the ajar indicator and the courtesy light in the vehicle turns on.

IN THE DRAWINGS

FIG. 1 depicts a prior art system in a vehicle employing pushbutton switches on individual cables for indicating door-ajar door-open conditions;

FIG. 2 the present sensor system in a vehicle utilizing a single-wire bus;

DETAILED DESCRIPTION OF A PREFERRED EMBODIMENT

Figure 1:
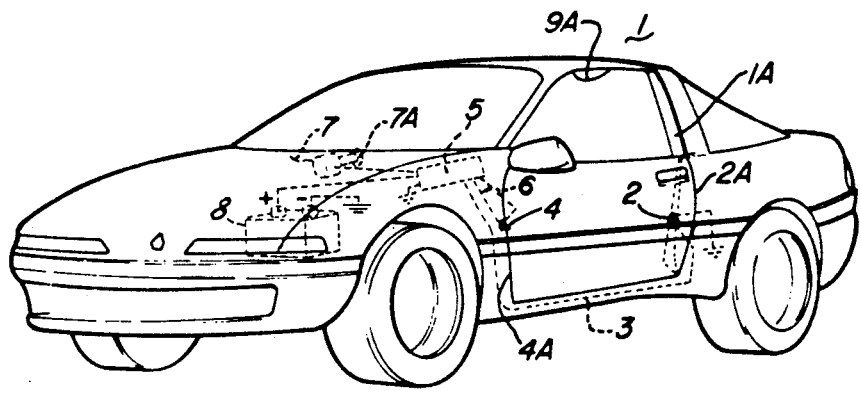

FIG. 1 depicts a prior art door ajar/switch system 1. This system permits turning on a courtesy light 9A, usually in the ceiling of a vehicle, and a door ajar indicator light (not shown) normally mounted in a dashboard or a message center in the vehicle.

The courtesy light 9A illuminates as soon as a door is opened when the operator enters the vehicle. The door ajar indicator activates when the operator inserts his car key in the ignition switch, turns the key to an operating position and intentionally or unintentionally leaves the door ajar and/or open.

This prior art FIG. 1 also depicts a normally closed courtesy light switch 4 fixedly mounted to a door hinge post 4A for closing a circuit that turns on the courtesy light 9A when a car door 1A opens and turns the courtesy light off when the car door 1A closes.

A control system 5 contains a light driver circuit for providing power to the courtesy light 9A upon the activation of the courtesy light switch 4. The control system 5 receives power for lighting the courtesy light from a car battery 8. A first harness 6 connects the courtesy light switch 4 to the control system 5.

After the operator enters the vehicle and turns the ignition key 7A in the ignition 7, ignition voltage equivalent to the battery voltage routes to a terminal of control system 5 to provide power for operating the door ajar indicator in response to door 1A in a door ajar condition or a door open condition. A normally closed pushbutton type door ajar switch 2 fixedly mounts to a door latch post 2A for closing a circuit that turns on the door ajar indicator which warns the operator that the door 1A stands ajar. A second harness 3 connects the door ajar switch to the control system 5.

Such a system requires the use of two different cable harnesses and two spaced apart pushbutton type switches and requires additional labor at the assembly plant to install. The doors that function with the pushbutton switches usually have gaps between the door and door sills which often vary from one vehicle to the other. Hence, the spacing between the door and the switches requires checking and most times adjustments to make the system work effectively.

Figure 2:
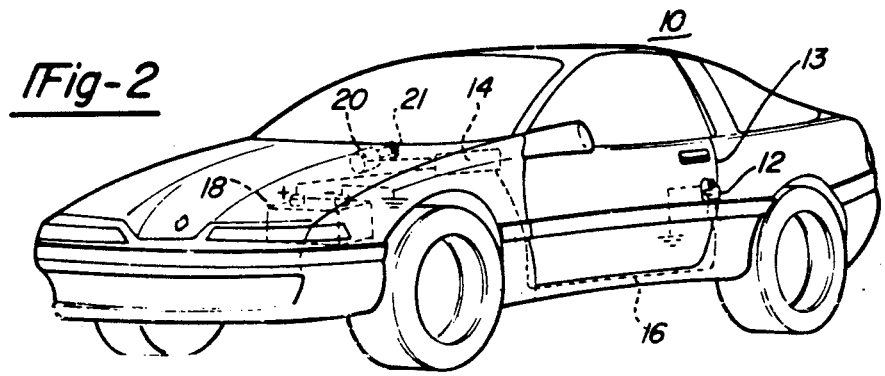

Turning to FIG. 2, there is shown a combination door ajar and courtesy light switch of system 10 of the present invention. System 10 includes special sensors mounted in door latch 12 which send and receive signals from a control system 14 over a single wire bus 16. Power comes to system 10 from the vehicle battery 18. But, however, the door ajar portion of system 10 operates after an ignition switch key 21 in ignition switch 20 is turned to the ON position.

DOOR LATCH GEAR RATCHET

Referring now to FIG. 3, there is shown in a perspective view a novel door latch containing these special sensors used in system 10. The door latch 12 contains a conventional gear ratchet modified to form a new form of a gear ratchet 24 enclosed in a ratchet housing 31.

Ratchet 24 pivotally mounted about a pivot 39 interacts with door post striker 22 when door 13 opens, stands ajar or closes.

Embedded in a finger-shaped tooth section 26 of ratchet 24, An elongated door ajar permanent magnet 28 creates a magnetic field that interacts with a magnetic field sensing element of a door-ajar smart sensor 40 mounted on an interior surface of housing 31. Embedded in an ear-shaped tooth 30 of ratchet 24, a substantially square-shaped door-open magnet 32 generates a magnetic field that interacts with a door open smart sensor 42 mounted in another interior face of housing 31. Sensors 40 and 42 only respond to their respective magnets 28 and 32.

DOOR-OPEN OPERATION

Figures 3A, 3B, 3C:
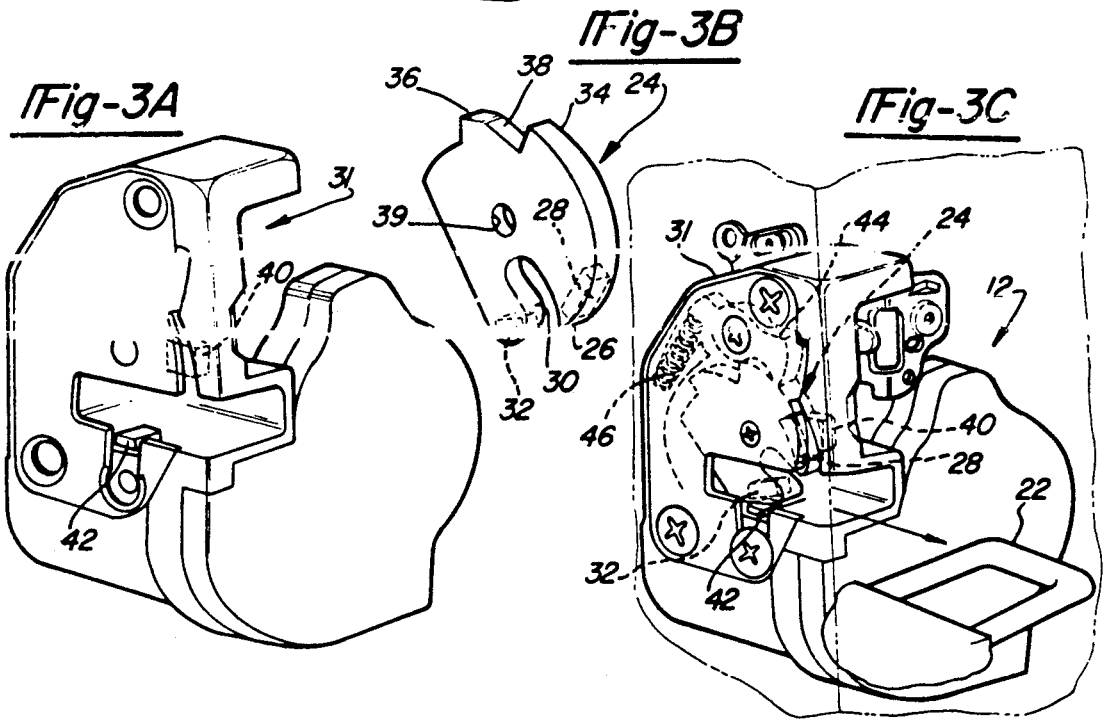
FIGS. 3A-3C depict an exploded perspective view of a door latch mechanism.

With reference now to FIG. 3C, when door 13 opens, ratchet 24, which is spring loaded, rotates to the position illustrated. There, the door ajar magnet 28 comes into alignment with the door ajar sensor 40 which causes sensor 40 to generate a signal that routes to a door ajar indicator. Also, the door-open magnet 32 comes into alignment with the door-open sensor 42 to likewise cause sensor 42 to generate a signal which lights the courtesy light 9A. In this position, a door open cam portion 34 of gear ratchet 24 contacts a pawl 44 in a manner which causes a spring 46 that restricts movement of pawl 44 such that pawl 44 clears a door-ajar notch 38 of ratchet 24.

Figure 4:
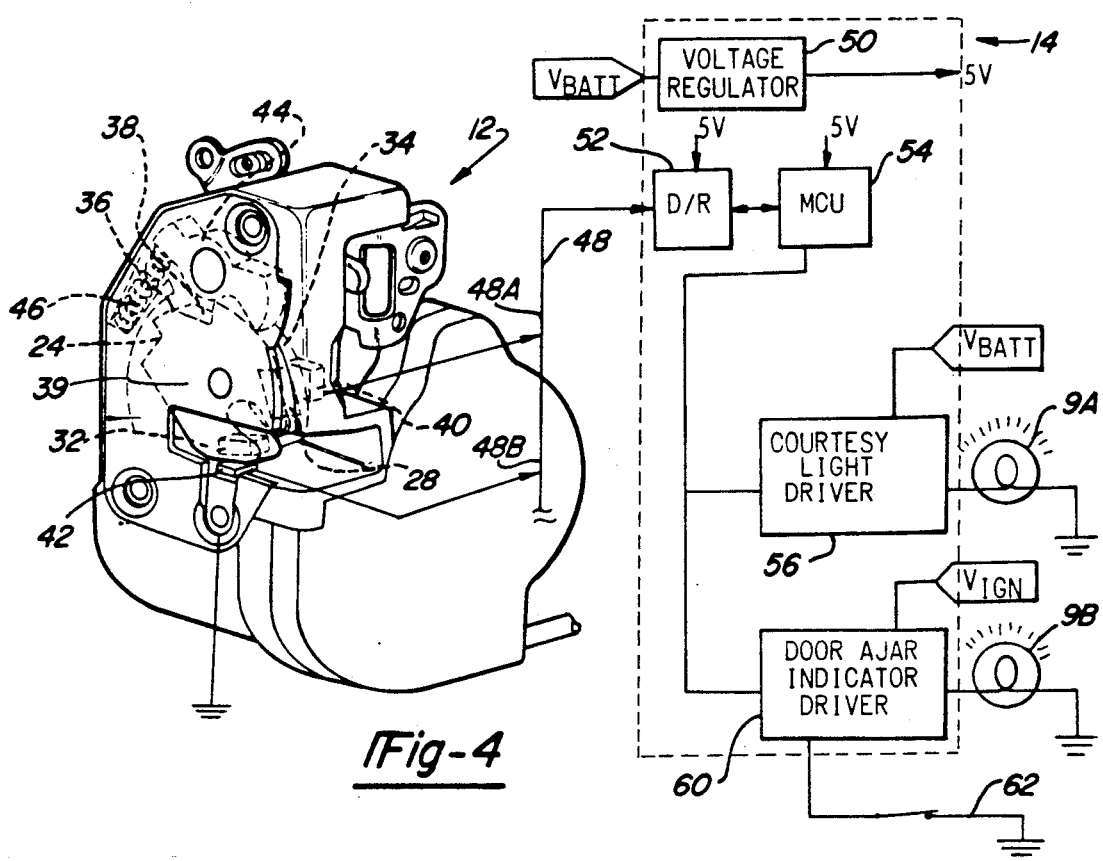
FIG. 4 depicts an exploded perspective view of the latch mechanism and a block diagram of the sensor communications system when the door is open.

As shown in FIG. 4, with gear ratchet 24 in the open position, electrical signals route from sensor 40 and 42 over signal wire lines 48A and 48B that connect to a single wire bus 48 which routes throughout the vehicle. Bus 48 terminates at a single ended port of a driver/receiver (D/R) unit 52 of a control system 14. D/R 52 responds to the electrical signals from sensors 40 and 42. The magnetic fields about the sensors cause a sensing element, such as a hall effect transistor contained therein, to switch ON and to provide an electric current signal over the single wire bus 48.

D/R 52 controlled by a microcontroller (MCU) 54 provides power and control signals to all the smart sensors connected to bus 48. These smart sensors include circuits for informing MCU 54 the presence of each sensor (the status of the sensor) and whether or not the sensor has been switched ON or OFF (the state of the sensor). D/R 52 converts this information to logic level signals that MCU 54 can use.

MCU 54 uses the status and state of the sensor information to issue commands to a courtesy light driver circuit 56 and a door ajar indicator driver circuit 60 in response to the various positions of ratchet 24.

Bus 48 is a bi-directional single wire communication assembly which transmits signals and power between D/R 52 and the smart sensors 40 and 42. Illustratively, this single wire may be a flexible length of wire of a suitable gauge covered with an insulated material at all points except for smart sensor interface regions.

In the door-open position, as indicated in FIG. 4, MCU 54 sends address commands over bus 48 to poll smart sensors 40 and 42 to determine whether or not they are present and to determine whether or not they are ON. Sensors 40 and 42 turn ON in the presence of the magnetic fields from door ajar magnet 28 and door open magnet 32 respectively. These signals route back to MCU 54 by bus 48 and D/R 52. MCU 54, in turn, will forward command signals to the courtesy light driver 56 to turn ON the courtesy light 9A and command signals to door ajar indicator driver 60 to turn on the door ajar indicator 9B provided the ignition switch 62 is turned ON. If the ignition switch 62 is not turned on, then only the courtesy light illuminates.

DOOR-AJAR OPERATIONS

Figure 5:
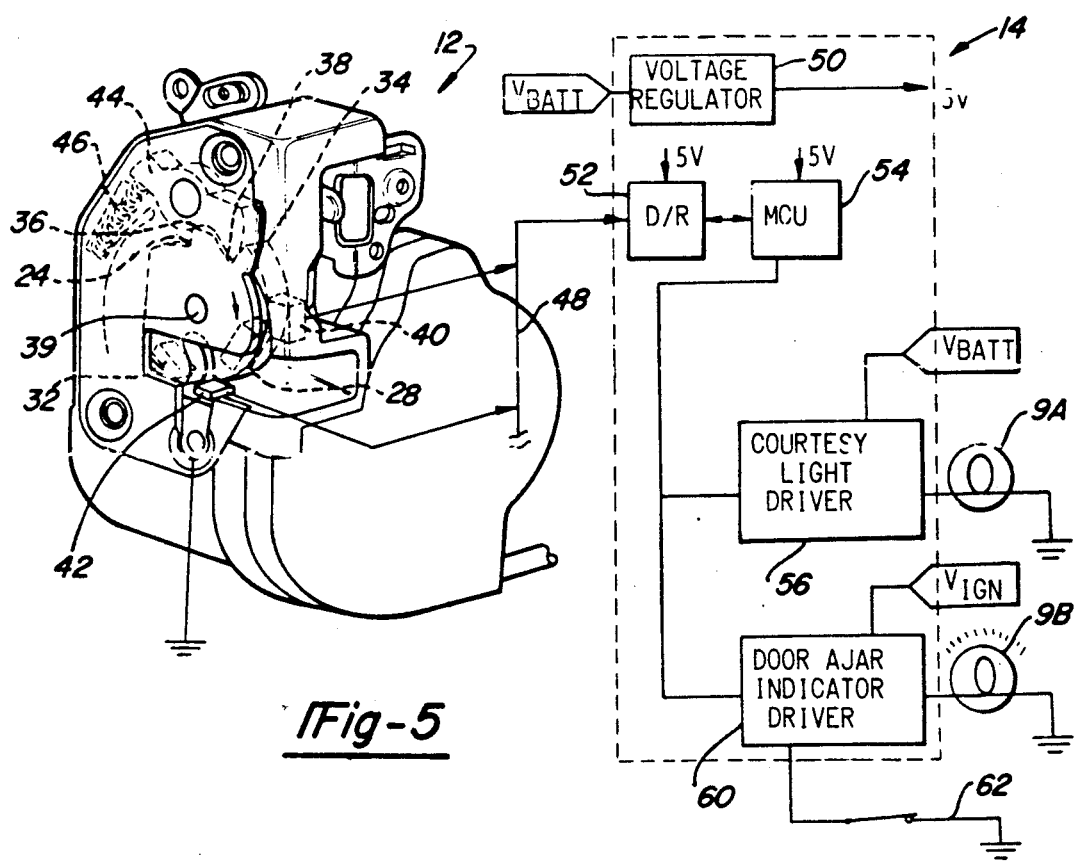
FIG. 5 depicts an exploded perspective view of the latch mechanism and a block diagram of the sensor communications system when the door is ajar.

With reference now to FIG. 5 with door 13 positioned to a door ajar condition and the ignition switch 62 turned ON, door open magnet 32 moves to a position where its magnetic field has no effect on the door open sensor 42. However, door ajar magnet 28 continues to provide a magnetic field which effects an turns on door ajar sensor 40. In the door ajar position, pawl 44 engages the door-ajar notch 38 of ratchet 24 in a manner which holds ratchet 24 in the door ajar position.

MCU 54 again polls the door ajar and door open sensors 40 and 42 respectively and receives a response over bus 48 from the door-ajar sensor 40 only that the sensor has turned ON. In response to the door-ajar sensor signal, MCU 54 commands the door-ajar, indicator driver 60 to turn ON causing the door ajar indicator 9B to illuminate.

DOOR-CLOSED OPERATIONS

Figure 6:
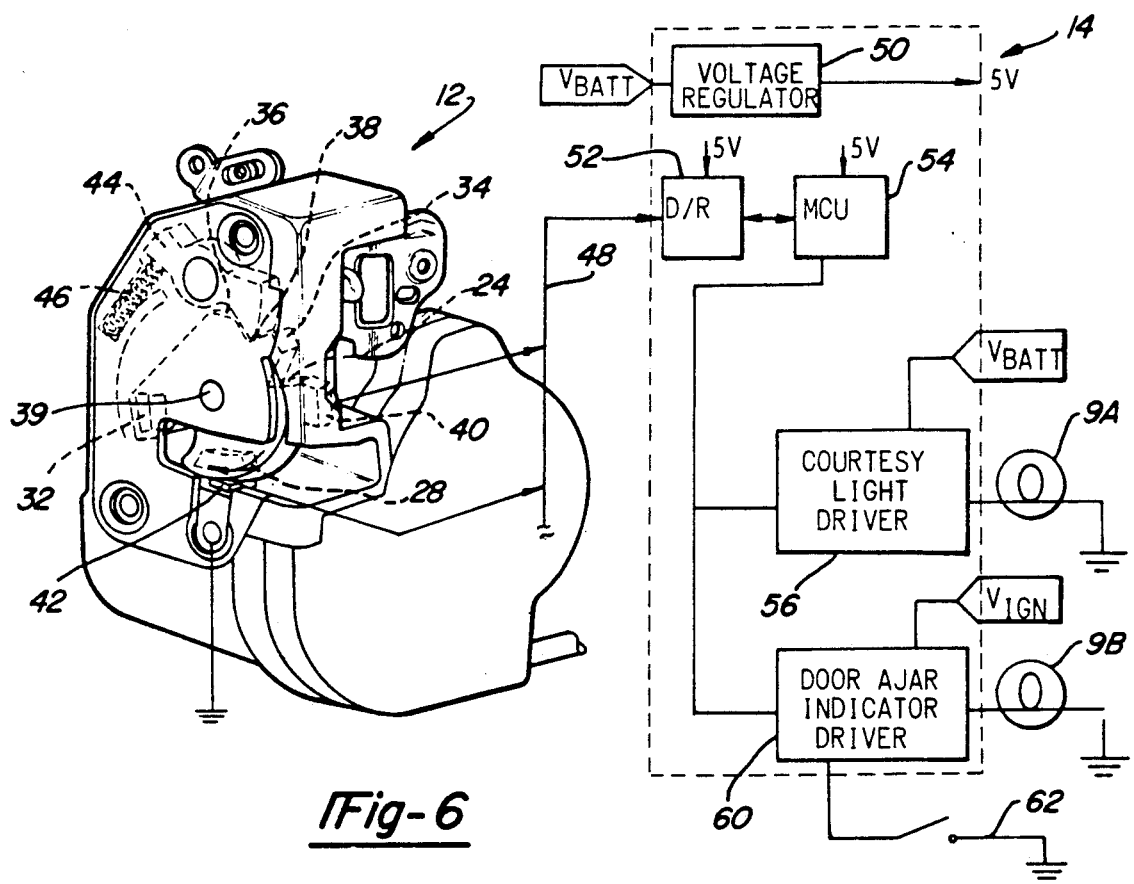
FIG. 6 depicts an exploded perspective view of the latch mechanism and a block diagram of the sensor communications system when the door is closed.

Refer now to FIG. 6, when door 13 closes, the door ajar magnet 28 rotates to a position facing the door-open sensor 42. However, sensor 42 is insensitive to the magnetic field that emanates from magnet 28, but the door-open magnet 32 is positioned at a location away from both sensors. Hence, its magnetic field has no effect. In this position, an end portion of pawl 44 locks up against a stop 36 of ratchet 34. Since neither of the sensors are turned ON, the courtesy light and the door ajar indicator remain OFF.

FLOWCHART

Figure 7:
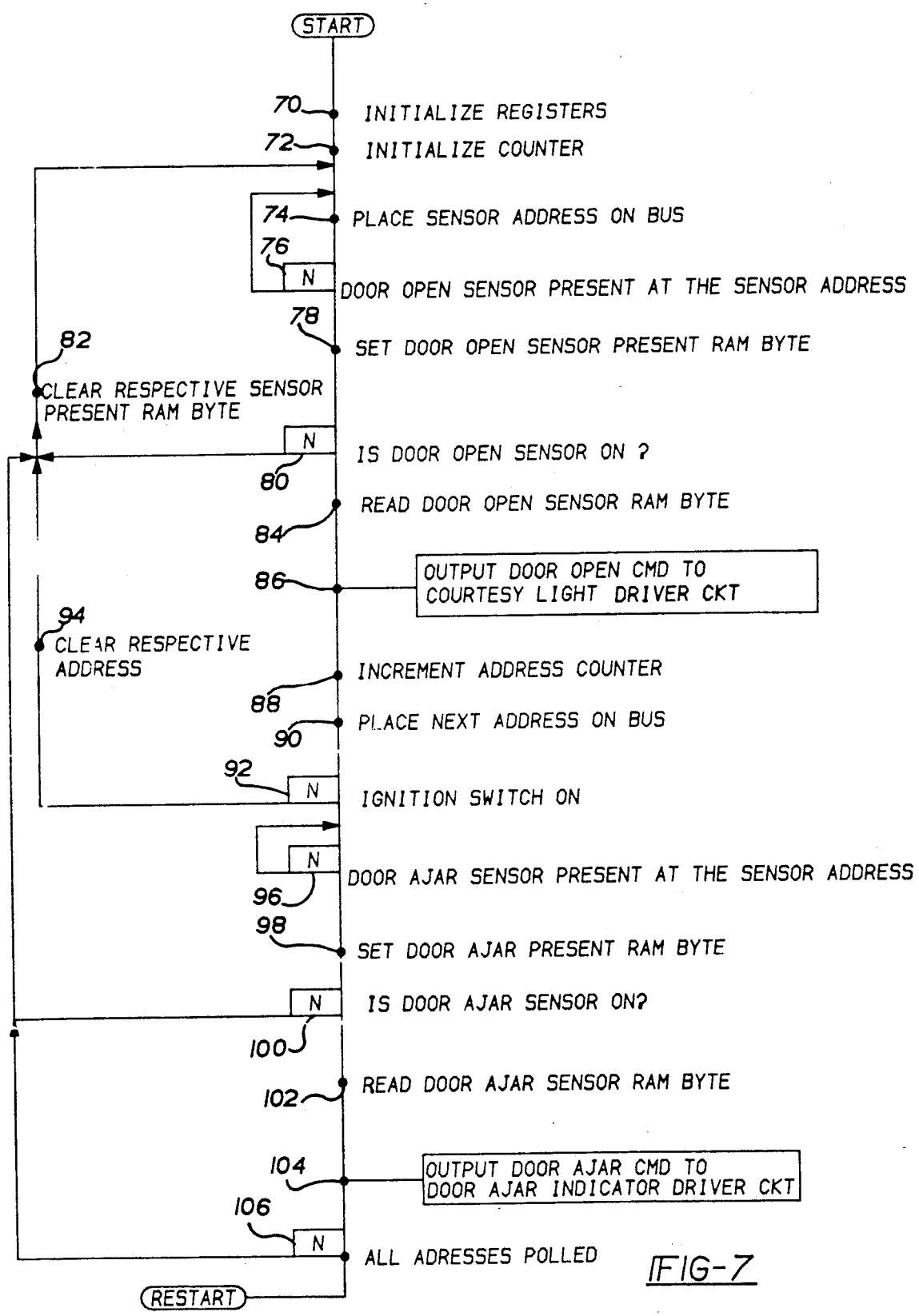
FIG. 7 depicts a flowchart of the program employed by the microcontroller in this invention.

The flowchart diagram of FIG. 7 differs from the conventional bar and diamond flowcharts. In FIG. 7, flow of control passes along lines and proceeds down the page. Conventional start-up of program and end of program boxes are used. Actions are signified by a small block circle on the lines, the description of the action being given to the left or right of the flow lines. Actions only take place on vertical lines. Signals or actions entering or leaving the flow of control lines appear in trapezoidally-shaped boxes. When a decision has to be introduced, the flow line branches to the right or left. The branch may be caused by a YES or NO condition, with this being signified by a Y or N in a box as indicated. Where secondary flow rejoins the main flow, an arrowhead is used. A reference number will indicate the points or steps along the line being discussed.

The flowchart of FIG. 7 depicts a simplified version of a program executed by MCU 54. After a turn ON delay, MCU 54 executes a small start-up program which sets all CPU registers with correct values and clears all information presently in memory before accepting information from D/R 52 (step 70). MCU 54 also initializes the counters in RAM and the stored variables (step 72). The desired addresses to be sent over bus 48 are stored in memory and all initial conditions are met. In this embodiment, the stored information illustratively includes the sequence for addressing the individual sensors in the door latch and the associated electrical devices. As can be appreciated by those skilled in the art, MCU 54 operates in the MHz range while system 10 operates around the one kHz range. Hence, MCU 54 can perform many tasks before system 10 reacts. As indicated at step 74, MCU 54 places the sensor addresses on the bus. To accomplish this, MCU 54 sends a series of commands to D/R 52 which develops, illustratively, an offset square wave signal which contains the address codes for addressing sensors 40 and 42.

If the smart sensors are functioning correctly, a current signal will emanate from them indicating that the sensors are present and are operating.

At step 76, MCU 54 makes a decision as to whether or not the door-open sensor is present at the address assigned. If not, MCU 54 retries the address. If it is present, then MCU 54 proceeds to step 78 and sets the door-open sensor present RAM BYTE.

Then MCU 54 makes a decision as to whether or not the door-open sensor is ON. If not, MCU 54 branches to step 82 and clears the respective sensor present RAM BYTE and then returns to step 74 to readdress the sensors. If the door-open sensor is ON, MCU 54 then executes the instruction at step 84 which requires reading the door-open sensor RAM BYTE and from that data develops signals used by the D/R 52 to output door-open commands to the courtesy light driver circuit 56 (step 86) that provides current for lighting the courtesy light 9A.

As indicated at step 88, MCU 54 is instructed to increment the address counter and then place the next address on the bus (step 90). Then MCU 54 determines whether or not the ignition switch is ON (step 92). If the ignition switch is not ON, MCU 54 clears the respective address (step 94), and then returns to the loop that includes step 74.

If the ignition switch is ON, MCU 54 makes a determination as to whether or not the door-ajar sensor is present at the proper address (step 96). If not, MCU 54 loops around and repeats step 96. If the sensor is present at the proper address, MCU 54 sets the door-ajar present RAM BYTE (step 98) and then determines whether the door-ajar sensor has been turned ON (step 100). If not, MCU 54 returns to the loop that includes step 82. If the door-ajar sensor has been turned ON, MCU 54 is instructed in step 102 to read the door-ajar sensor RAM BYTE and then output a door-ajar command to the door ajar indicator driver circuit 60 to cause circuit 60 to apply current for lighting the door-ajar indicator 9B (step 104).

Afterwards, MCU 54 determines whether all addresses have been polled (step 106). If not, MCU 54 returns to the loop including step 82. If so, MCU 54 restarts the sequence.

Although a single door-ajar and door-open sensor scheme is described, it should be understood by those skilled in the art this arrangement can apply to multiple door latches employing smart sensors for determining whether or not a door latch is in an open, ajar or closed condition.

I claim:

1. A sensor communication system within a vehicular environment for monitoring the status of a plurality of doors to determine whether any of the doors are open, closed or in an ajar condition, said system providing an indication to an operator (1) when any door is open and (2) after ignition voltage occurs when any door is ajar, said system comprising:
   (A) a door latch means disposed in each door that permits the operator to open and latch close the door, said latch means including:
   i) a door-ajar smart sensor means, sensitive to magnetic fields of permanent magnets, disposed on an interior surface of said latch means for sensing, after the occurrence of ignition voltage, the door being in an ajar condition and for providing an electrical signal indicative of the door being ajar;
   ii) a door-open smart sensor means, sensitive to magnetic fields of permanent magnets, disposed on another interior surface of said latch means for sensing when the door is open and for providing an electrical signal indicative of the door being open;
   iii) pawl means pivotally mounted within the interior of the latch means and rotationally restrained by a retaining spring for providing control over placing said latch means in a door open, closed or ajar condition;
   iv) a gear ratchet means spring loaded to be in a normally closed position about a pivot point within said latch means so as to interact with a door post striker to latch the door closed when the operator puts the door in a closed condition, said ratchet means having (a) an elongated door-ajar permanent magnet disposed in a first region of an outer edge of said ratchet means for providing a magnetic field sensed by said door-ajar smart-sensor means when the door is in an ajar and/or open condition; (b) a substantially square-shaped, door-open, permanent magnet disposed in a second region of the outer edge of said ratchet means for providing a magnetic field sensed by said door-open smart-sensor means when the door is in an open condition; (c) a door-open stop arranged in a third region of the outer edge of said ratchet means for interacting with said pawl means to lock said ratchet means in the open position when the door is opened; (d) a door-ajar notch disposed in a fourth region of the outer edge of said ratchet means for interacting with said pawl means to lock said ratchet means in the door-ajar condition when the door is ajar; and a door-closed cam surface in a fifth region of the outer edge of the ratchet means for interacting with said pawl means in a manner that allows the spring loading the ratchet means to drive the ratchet means to the normally closed condition;
   (B) a courtesy light driver means for lighting a courtesy light within the interior of the vehicular environment when the door is in an open condition;
   (C) a door-ajar indicator driver means for turning on an indicator in the interior of the vehicular environment when the door is in an ajar and/or open condition; and
   (D) a sensor communications network means coupled to said door-ajar and door-open smart-sensor means at one end by means of a single-wire bus and to said courtesy light and said door-ajar indicator-driver means at another end by a direct line, said network means receiving the electrical signals from said smart-sensor means at an input port and, after processing the signals, producing at an output port commands to said light driver means and/or said indicator driver means to cause said light driver means and/or said indicator driver means to activate the respective light and/or the indicator.

2. Apparatus in accordance with claim 1 wherein said door-ajar and said door-open magnets are embedded in the outer edges of the ratchet means.

3. Apparatus in accordance with claim 2 wherein said smart sensors are embedded in the interior surfaces of the latch means.

4. Apparatus in accordance with claim 3 wherein a signal output terminal of both the door-ajar and the door-open smart sensor means are connected to the single wire bus at a single point while a ground return output terminal from each sensor is connected to a common ground point within said latch means.

5. Apparatus in accordance with claim 3 wherein said door-ajar smart sensor means is active when the ignition voltage occurs, and wherein said door-open smart-sensor means is active with or without the occurrence of the ignition voltage.

* * * * *